US009948809B2

(12) United States Patent
Hamaguchi

(10) Patent No.: US 9,948,809 B2
(45) Date of Patent: Apr. 17, 2018

(54) IMAGE FORMING APPARATUS, MEMORY MANAGEMENT METHOD FOR IMAGE FORMING APPARATUS, AND PROGRAM, USING DISCRETELY ARRANGED BLOCKS IN PRIORITIZING INFORMATION

(71) Applicant: CANON KABUSHIKI KAISHA, Tokyo (JP)

(72) Inventor: Jun Hamaguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 564 days.

(21) Appl. No.: 14/170,262

(22) Filed: Jan. 31, 2014

(65) Prior Publication Data
US 2014/0218767 A1 Aug. 7, 2014

(30) Foreign Application Priority Data

Feb. 1, 2013 (JP) ................... 2013-018366
Feb. 1, 2013 (JP) ................... 2013-018386

(51) Int. Cl.
H04N 1/00 (2006.01)
H04N 1/32 (2006.01)
(52) U.S. Cl.
CPC ....... H04N 1/0097 (2013.01); H04N 1/32358 (2013.01); H04N 1/32587 (2013.01); H04N 1/32593 (2013.01)
(58) Field of Classification Search
None
See application file for complete search history.

(56) References Cited

U.S. PATENT DOCUMENTS

| 5,457,481 | A | * | 10/1995 | Sohn | G06T 7/2013 345/531 |
| 6,273,535 | B1 | * | 8/2001 | Inoue | B41J 3/00 347/2 |
| 2004/0061530 | A1 | * | 4/2004 | Tanigawa | H04N 5/46 326/93 |
| 2007/0206429 | A1 | * | 9/2007 | Ware | G06F 13/1689 365/194 |
| 2008/0199235 | A1 | * | 8/2008 | Shoji | B41J 11/008 399/364 |
| 2008/0235489 | A1 | * | 9/2008 | Gorobets | G06F 12/0246 711/217 |
| 2009/0070518 | A1 | * | 3/2009 | Traister | G06F 12/0246 711/103 |
| 2012/0224207 | A1 | * | 9/2012 | Sueshige | G06F 3/1205 358/1.13 |
| 2013/0173875 | A1 | * | 7/2013 | Kim et al. | 711/160 |

FOREIGN PATENT DOCUMENTS

JP 2002-324008 A 11/2002
JP 2008-097339 A 4/2008

* cited by examiner

*Primary Examiner* — Eric A Rust
*Assistant Examiner* — Pawandeep Dhingra
(74) *Attorney, Agent, or Firm* — Canon U.S.A., Inc. IP Division

(57) ABSTRACT

An image forming apparatus that performs image processing using information stored in a semiconductor memory includes an obtaining unit configured to obtain from the semiconductor memory a block size used for data reading and writing, and a management unit configured to discretely arrange and manage, with respect to a specific region set in the semiconductor memory, use-based information to be updated along with execution of the image processing, included in the stored information, according to the obtained block size.

12 Claims, 8 Drawing Sheets

FIG. 4

| | 2001 | 2002 | 2003 | 2004 | 2005 | 2006 | 2007 | 2008 | 2009 |
|---|---|---|---|---|---|---|---|---|---|
| | MANAGEMENT NUMBER | REGION NAME | SIZE (kb) | UPDATE FREQUENCY | REAL-TIME PROPERTY | PRIORITY LEVEL | DISCRETE ARRANGEMENT | NUMBER OF UPDATES | ARRANGEMENT POSITION |
| | 1 | CHARGING COUNTER | 54 | 10 | 10 | 100 | Y | 3200 | 1 |
| | 2 | DEPARTMENTAL COUNTER | 72 | 10 | 8 | 80 | Y | 2604 | 257 |
| | 3 | COUNTER BY COMPONENT | 8 | 10 | 8 | 80 | Y | 2754 | 513 |
| | 4 | COUNTER BY MODE | 8 | 10 | 8 | 80 | Y | 2750 | 757 |
| | 5 | IMAGE DENSITY ADJUSTMENT VALUE | 220 | 7 | 7 | 49 | Y | 1802 | 1025 |
| | 6 | IMAGE POSITION ADJUSTMENT VALUE | 24 | 5 | 7 | 35 | Y | 1502 | 1281 |
| | 7 | SECURITY INFORMATION | 2 | 3 | 7 | 21 | Y | 712 | 1537 |
| | 8 | TRANSMISSION JOB INFORMATION | 140 | 4 | 6 | 24 | N | 914 | 1793 |
| | 9 | RECEIVED JOB INFORMATION | 72 | 2 | 6 | 12 | N | 914 | 2073 |
| | 10 | FACSIMILE JOB INFORMATION | 3 | 2 | 6 | 12 | N | 914 | 2217 |
| | 11 | APPLICATION 1 | 12 | 1 | 4 | 4 | N | 312 | 2223 |
| | 12 | APPLICATION 2 | 8 | 1 | 4 | 4 | N | 312 | 2247 |
| | 13 | APPLICATION 3 | 4 | 1 | 2 | 2 | N | 312 | 2263 |
| | ... | ... | ... | ... | ... | ... | ... | ... | ... |
| | 20 | USER MANAGEMENT INFORMATION | 20 | 1 | 1 | 1 | N | 312 | 2283 |

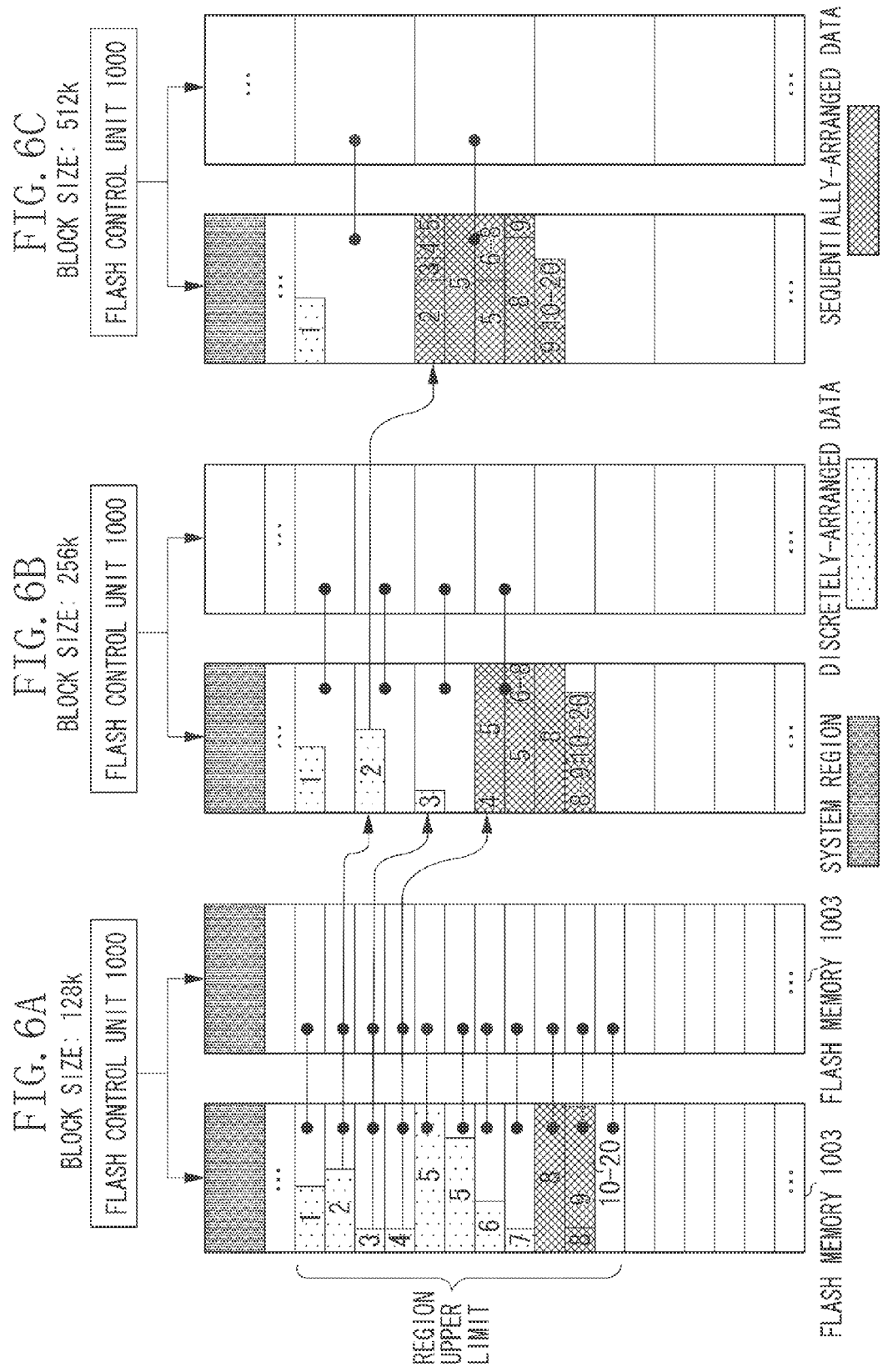

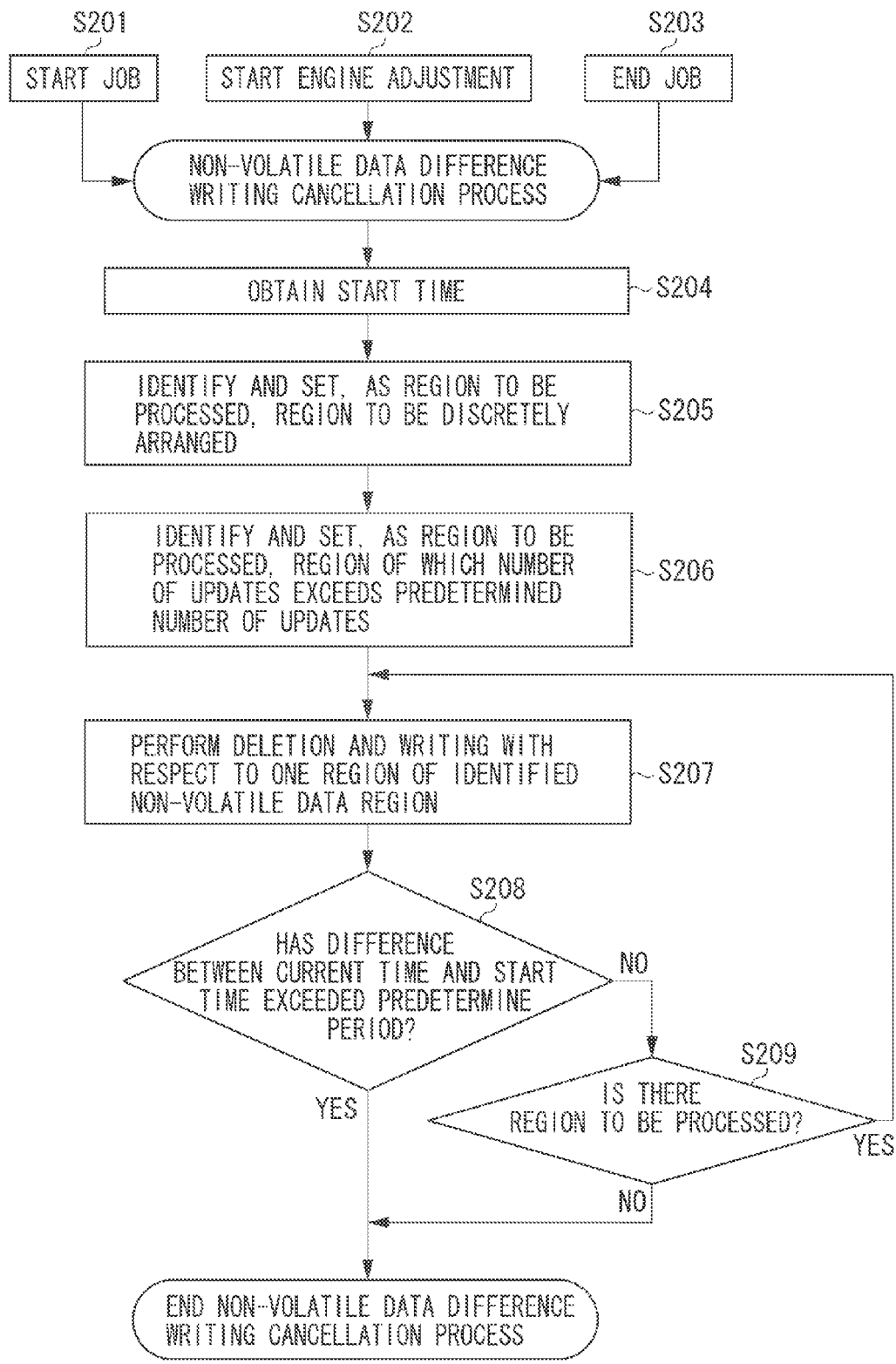

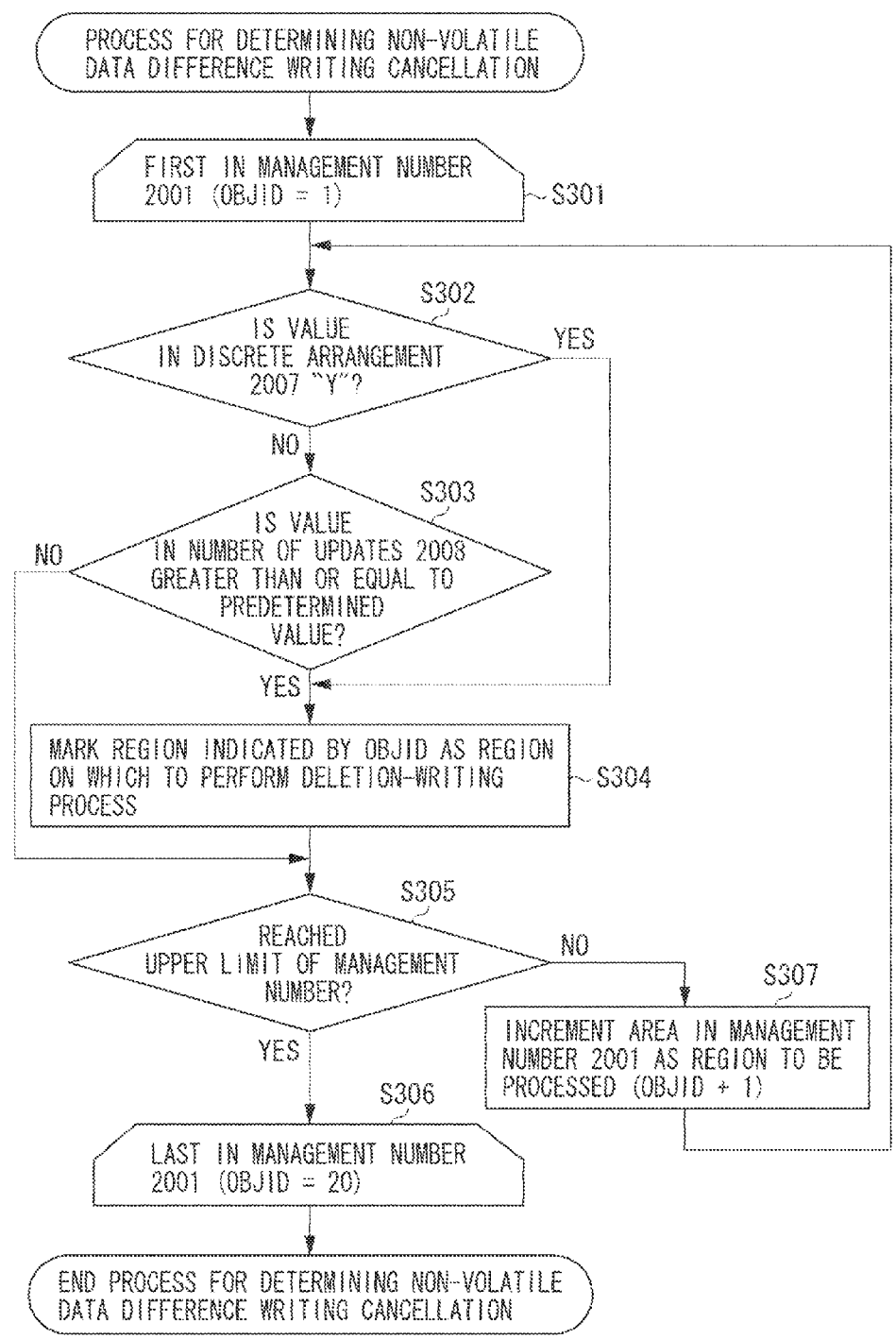

IMAGE FORMING APPARATUS, MEMORY MANAGEMENT METHOD FOR IMAGE FORMING APPARATUS, AND PROGRAM, USING DISCRETELY ARRANGED BLOCKS IN PRIORITIZING INFORMATION

BACKGROUND OF THE INVENTION

Field of the Invention

The present invention relates to an image forming apparatus which includes a semiconductor disk, a memory management method for the image forming apparatus, and a program.

Description of the Related Art

Conventionally, image forming apparatuses include a hard disk drive (HDD) and a static random access memory (SRAM). The HDD and the SRAM store programs, and realize a storage function for storing image data, performing editing, and managing auxiliary information.

In general, important non-volatile data which is required to be protected even when there is an unexpected power shutdown has been managed in the SRAM. Such non-volatile data stored in the SRAM is divided and classified into regions for each use case, and partial regions are updated according to the respective usages thereof.

It is necessary for each of such regions to be reliable. Further, since each of the regions is frequently updated at high speed, a high-speed SRAM having high reliability and high tolerance with respect to updating is required.

On the other hand, a solid state drive (SSD), which has high-speed performance and high reliability, has become capable of managing non-volatile data, which has been conventionally stored in the SRAM. The SSD is a semiconductor disk, which has rapidly become widely-used in mobile personal computers (PC) due to the increased capacity and lowering of cost.

Further, the SSD can be randomly-accessed at high speed as compared to the HDD. Furthermore, the SSD is of low power consumption, high impact resistance, light weight, and space-saving. In particular, an initial operation such as a spin-up, which is necessary in the HDD when a system is activated, is unnecessary in the SSD. The SSD is thus greatly effective in high-speed data transfer and shortening start-up time, so that it is also gathering attention as a storage device for image forming apparatuses.

However, a response speed of a NAND-type flash memory, which is a storage device included in the SSD, is slow on its own. Further, there is an upper limit on writable frequency of the flash memory (i.e., approximately 100,000 times for a single level cell (SLC) type, and 10,000 times for a multi level cell (MLC) type).

Furthermore, when data previously stored in the NAND-type flash memory is to be deleted, the stored data can be deleted only in units of blocks. As a result, when the stored data is to be rewritten, the following method is performed. The necessary portion of the data to be rewritten is copied in a block other than the original block. Update data is then written in the block other than the original block, and the data in the original block is deleted.

A considerable amount of time is required for rewriting the data according to the above-described method.

To solve such an issue, Japanese Patent Application Laid-Open No. 2002-324008 and Japanese Patent Application Laid-Open No. 2008-097339 discuss the following technique. A flash memory controller included in the SSD causes the block storing the original data and the block for writing the update data to coexist as a pair.

More specifically, the flash memory controller performs the following operation over a plurality of flash memories. The flash memory controller additionally writes in a different block an update portion of rewrite data without changing the data in the original block. When the data is to be read, the flash memory controller merges the contents of both blocks. As a result, the time for reading the regions other than the update portion and the time for merging the read portion with the update portion become unnecessary as compared to rewriting of the data as described above, so that the updating time becomes shortened.

Further, if the block size has become fully-used when the update data is additionally written, it is necessary to write back in the original block all of the update information (i.e., perform pair cancellation) and allocate a different block. In such a case, extra time becomes necessary for allocating a new block with respect to additionally writing the data corresponding to the update portion for evenly distributing the write frequency, so that the updating time becomes longer.

Furthermore, in recent years, there is an increasing demand for security and privacy protection of data stored in a storage device included in image forming apparatuses. Spool data and the stored data recorded in the storage device are thus required to be completely erasable in the flash memory.

To solve such issues, the flash memory controller included in the SSD cancels a difference updating state in the above-described pair, writes back the difference data in the original data, and discards the difference information (i.e., performs a pair cancellation-data deletion process). The pair cancellation-data deletion process is realized by performing a data deletion-writing process in which the data to be deleted becomes completely deleted on the flash memory, as an extended command.

As described above, non-volatile information can be written and read at high speed by accessing the SSD via the controller, which controls a plurality of flash memories as one device.

However, since each region in the SSD is managed in units of blocks, if the above-described SRAM data is arranged in the same size, the divided regions are collectively updated in units of blocks.

In such a case, it becomes necessary for the data included in one block to be updated in a plurality of use cases. The number of updates for each block per unit time thus becomes high, and the above-described pair cancellation process is executed. The pair cancellation process may take 10 to 100 times longer as compared to performing the additional writing process, so that the process time for updating a region suddenly becomes slow.

In particular, when the image forming apparatus executes a print operation, it becomes necessary to perform updating. For example, if there is a sudden delay in writing charging information, the image forming apparatus may become unable to guarantee processing the original number of sheets to be printed per unit time.

In recent years, a solid state drive (SSD) has rapidly become widely-used in mobile personal computers (PC) by achieving higher capacity and lower cost. The SSD can be randomly accessed at high speed as compared to the HDD. Further, the SSD is of low power consumption, high impact resistance, light weight, and space-saving. In particular, an initial operation such as a spin-up, which is necessary in the HDD when a system is activated, is unnecessary in the SSD. The SSD is thus extremely effective in high-speed data transfer and shortening start-up time, so that it is also gathering attention as a storage device for image forming apparatuses.

However, a response speed of a NAND-type flash memory, which is a storage device included in the SSD, is slow on its own. Further, there is an upper limit on writable frequency of the flash memory (i.e., approximately 100,000 times for a single level cell (SLC) type, and 10,000 times for a multi level cell (MLC) type).

Further, there is a decreasing trend in the number of times the flash memory is rewritable from the current number due to processes becoming more fine. In response to such issues, a flash memory controller included in the SSD employs a technique referred to as wear leveling. More specifically, the flash memory controller evenly writes data in different locations so that writing does not become concentrated on the same region, and thus extends a life of the storage device.

Furthermore, when data previously stored in the NAND-type flash memory is to be deleted, the stored data can be deleted only in units of blocks. As a result, when the stored data is to be rewritten, the following method is performed. The necessary portion of the data to be rewritten is copied in a block other than the original block. Update data is then written in the block other than the original block, and the data in the original block is deleted.

However, a considerable amount of time is required for rewriting data according to the above-described method. To solve such an issue, Japanese Patent Application Laid-Open No. 2002-324008 and Japanese Patent Application Laid-Open No. 2008-097339 discuss the following technique. The flash memory controller included in the SSD causes the block storing the original data and the block for writing the update data to coexist as a pair.

More specifically, the flash memory controller performs the following operation over a plurality of flash memories. The flash memory controller additionally writes an update portion of rewrite data in a different block without changing the data in the original block. When the data is to be read, the flash memory controller merges the contents of both blocks.

As a result, the time for reading the regions other than the update portion and the time for merging the read portion with the update portion become unnecessary as compared to rewriting the data as described above. The updating time thus becomes shortened.

Further, if the block size has become fully-used when the update data is to be additionally written, it is necessary to write back in the original block all of the update information (i.e., perform pair cancellation) and allocate a different block. In such a case, extra time becomes necessary for allocating a new block with respect to additionally writing the data corresponding to the update portion for evenly distributing the write frequency, so that the updating time becomes longer.

Furthermore, in recent years, there is an increasing demand for security and privacy protection of the data stored in the storage device included in the image forming apparatus. Spool data and the stored data recorded in the storage device are thus required to be completely erasable in the flash memory.

To solve such issues, the flash memory controller included in the SSD cancels a difference updating state in the above-described pair, writes back the difference data in the original data, and discards the difference information (i.e., performs a pair cancellation-data deletion process). The pair cancellation-data deletion process is realized by performing a data deletion-writing process in which the data to be deleted becomes completely deleted on the flash memory, as an extended command.

As described above, non-volatile information can be written and read at high speed by accessing the SSD via the controller, which controls a plurality of flash memories as one device.

Conventionally, important non-volatile data which is required to be protected even when there is an unexpected power shutdown has been managed in the SRAM. Such non-volatile data stored in the SRAM are generally divided and classified into regions for each use case, and partial regions are updated according to usage thereof.

It is necessary for each of such regions to be reliable. Further, since each of such regions is frequently updated at high speed, a high-speed SRAM having high reliability and high tolerance with respect to updating is required. In contrast, the SSD which has high-speed performance and high reliability has become capable of managing the non-volatile data which has been stored in the SRAM.

However, if the number of times a block is updated in the SSD exceeds a predetermined amount, the above-described pair cancellation process is performed. The pair cancellation process may take 10 to 100 times longer as compared to performing the additional writing process, so that the process time for updating a region suddenly becomes slow. In particular, when the image forming apparatus executes a print operation, it becomes necessary to perform updating. For example, if there is a sudden delay in writing charging information, the image forming apparatus may become unable to guarantee processing the original number of sheets to be printed per unit time.

SUMMARY OF THE INVENTION

The present invention is directed to a method for managing, with reliability and at low cost, data to be updated when performing image processing without delaying the image processing itself, even when a medium of the semiconductor memory is changed.

According to an aspect of the present invention, an image forming apparatus that performs image processing using information stored in a semiconductor memory includes an obtaining unit configured to obtain from the semiconductor memory a block size used for data reading and writing, and a management unit configured to discretely arrange and manage, with respect to a specific region set in the semiconductor memory, use-based information to be updated along with execution of the image processing, included in the stored information, according to the obtained block size.

Further features of the present invention will become apparent from the following description of exemplary embodiments with reference to the attached drawings.

BRIEF DESCRIPTION OF THE DRAWINGS

FIG. 4 illustrates a non-volatile data management configuration stored in the SSD illustrated in FIG. 3.

FIGS. 6A, 6B, and 6C illustrate examples of an arrangement of the non-volatile data in a flash memory illustrated in FIG. 3.

FIG. 7 is a flowchart illustrating a memory management method performed by the image forming apparatus.

FIG. 8 is a flowchart illustrating a memory management method performed by the image forming apparatus.

DESCRIPTION OF THE EMBODIMENTS

Various exemplary embodiments, features, and aspects of the invention will be described in detail below with reference to the drawings. Components described in the exemplary embodiments are examples and do not limit the scope of the invention.

Figure 1:
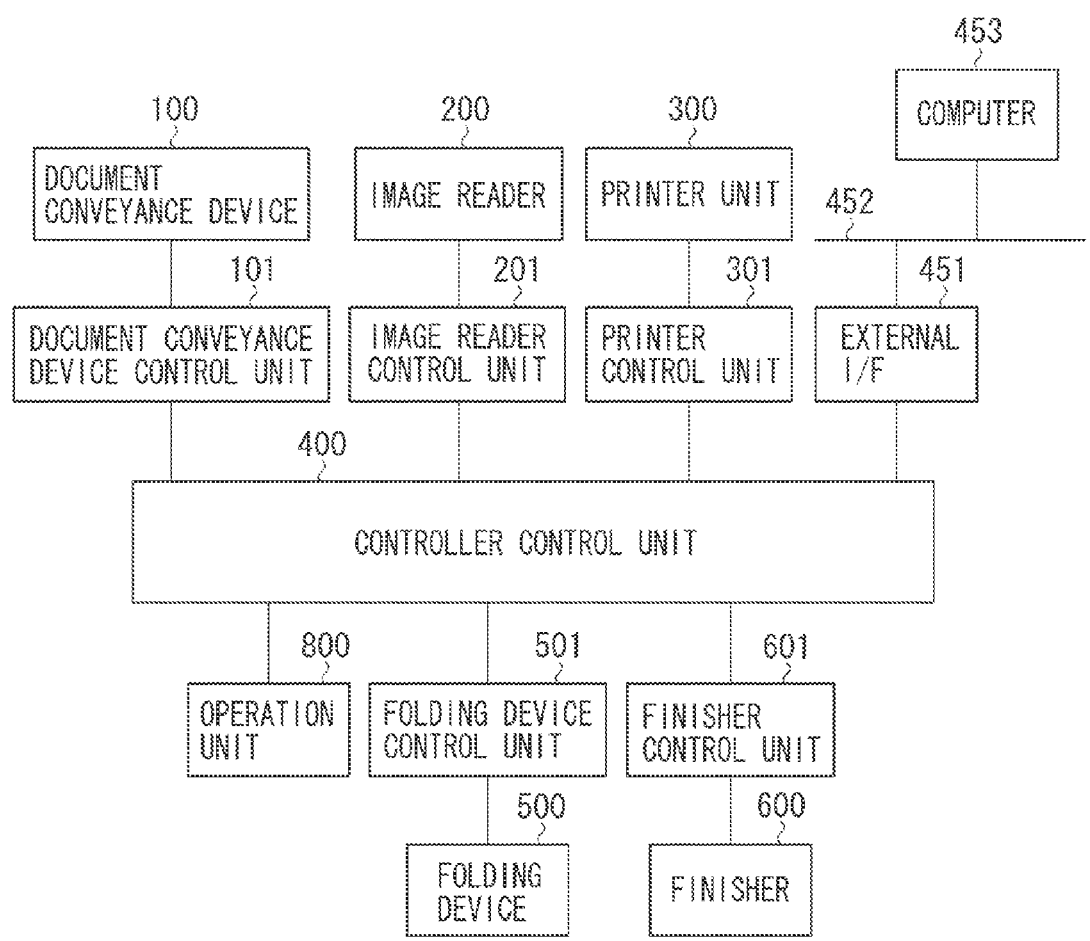
FIG. 1 is a block diagram illustrating a configuration of an image forming apparatus according to an exemplary embodiment of the present invention.

FIG. 1 is a block diagram illustrating an image forming apparatus according to an exemplary embodiment of the present invention. According to the present exemplary embodiment, a controller control unit 400, which controls the entire image forming apparatus, is a main component.

Referring to FIG. 1, the controller control unit 400 communicates with a document conveyance device control unit 101 and an image reader control unit 201 based on an instruction from an operation unit 800 or an external computer 453, and obtains image data of an input document. The document conveyance device control unit 101 controls a document conveyance device 100, and the image reader control unit 201 controls an image reader 200. Further, the controller control unit 400 communicates with a printer control unit 301, which controls a printer unit 300, and prints the image data on a sheet. Furthermore, the controller control unit 400 communicates with a folding device control unit 501 and a finisher control unit 601, and realizes a desired output such as by stapling or punching a hole in the printed sheets. The folding device control unit 501 controls a folding device 500, and the finisher control unit 601 controls a finisher 600.

An external interface (I/F) 451 functions as an I/F which connects to the external computer 453. For example, the external I/F 451 connects via an external bus 452 such as a network or a universal serial bus (USB), and rasterizes print data received from the external computer 453 into image data to be output. Further, the external I/F 451 transmits, to the external computer 453, image data stored in a semiconductor storage (SSD) 413 or a hard disk (HDD) 407 illustrated in FIG. 2 to be described below.

Figure 2:
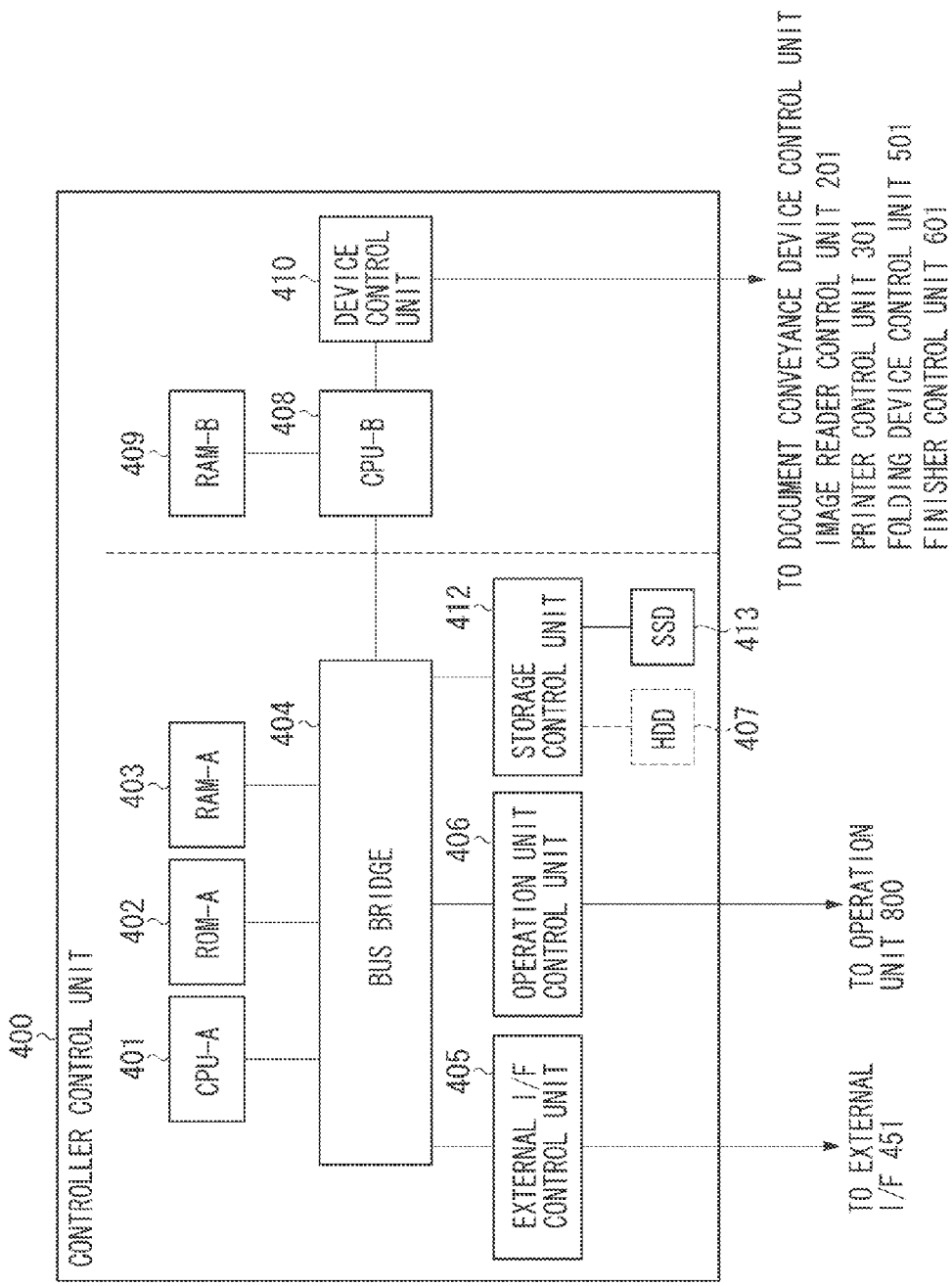
FIG. 2 is a block diagram illustrating a configuration of a controller control unit illustrated in FIG. 1.

FIG. 2 is a block diagram illustrating the configuration of the controller control unit 400 illustrated in FIG. 1.

Referring to FIG. 2, the controller control unit 400 includes a central processing unit (CPU)-A 401 and a CPU-B 408, which are respectively controlled by an operating system (OS).

The CPU-A 401 is connected to a bus bridge 404, and communicates with the CPU-B 408 via the bus bridge 404. The bus bridge 404 is also connected to a read-only memory (ROM)-A 402, which stores an initial activation program of the CPU-A 401. Further, the bus bridge 404 is connected to a RAM-A 403, which temporarily stores control data of the CPU-A 401, and is used as a work area for performing calculation when executing control. Furthermore, the bus bridge 404 is connected to a storage control unit 412, which controls the storage devices.

The SSD 413 stores main programs including the respective OS of the CPU-A 401 and the CPU-B 408. Further, if the HDD 407, i.e., an optional setting, is not connected, the SSD 413 is used as a storage location for storing image data obtained from the image reader 200 or the external I/F unit 451, image data edited via the operation unit 800, application data, and user data. According to the present exemplary embodiment, the SSD 413 is a flash disk, which employs a flash memory as a memory element.

If the HDD 407, i.e., the option storage, is connected, the HDD 407 is used as a storage location for storing image data obtained from the image reader 200 or the external I/F unit 451, image data edited via the operation unit 800, application data, and application programs, instead of the SSD 413. Further, the HDD 407 is used as a storage location for storing the application program and user preference data. The HDD 407 is configured to be accessible from the CPU-A 401 and the CPU-B 408.

Moreover, the bus bridge 404 is connected to an external I/F control unit 405 and an operation unit control unit 406. The external I/F control unit 405 controls the network and the USB interface, and the operation unit control unit 406 controls the operation unit 800.

The CPU-B 408 is connected to a RAM-B 409, which temporarily stores the control data of the CPU-B 408 and is used as a work area for performing calculation when executing control. Further, the CPU-B 408 is connected to a device control unit 410, which connects to and controls the document conveyance device control unit 101, the image reader control unit 201, the printer control unit 301, the folding device control unit 501, and the finisher control unit 601.

Figure 3:
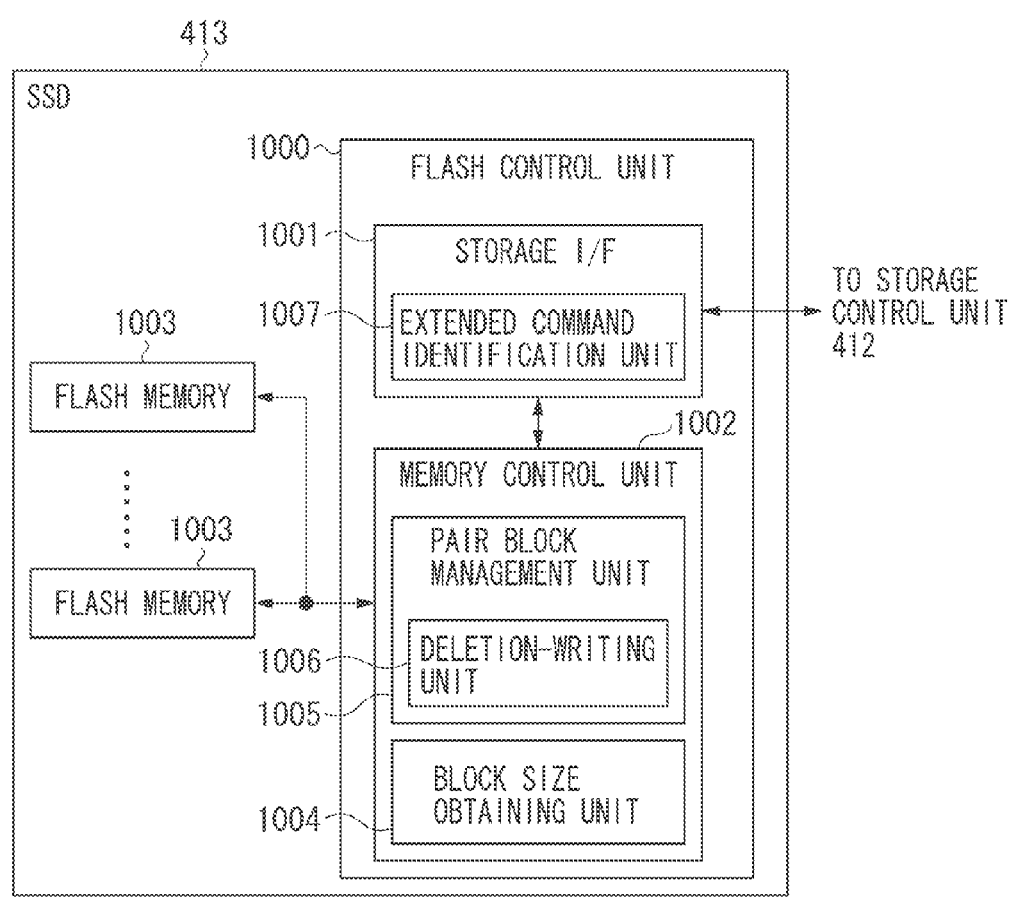
FIG. 3 is a block diagram illustrating an internal configuration of an SSD illustrated in FIG. 2.

FIG. 3 is a block diagram illustrating the internal configuration of the SSD 413 illustrated in FIG. 2.

Referring to FIG. 3, a flash control unit 1000 mainly includes a storage I/F 1001 and a memory control unit 1002. The storage I/F 1001 is a module for connecting to and communicating with the storage control unit 412 in the controller control unit 400.

According to the present exemplary embodiment, it is assumed that the storage I/F 1001 is a serial AT attachment (SATA) interface. Obtaining of the block size and the data deletion-writing process, which are characteristic of the present invention, are not defined as standard commands of SATA. If it is necessary to perform such control, the controller control unit 400 issues extended commands. The storage I/F 1001 thus includes an extended command identification unit 1007.

The memory control unit 1002 reads and writes data from and in a flash memory 1003 based on the command received by the storage I/F 1001. The memory control unit 1002 includes a pair block management unit 1005.

The pair block management unit 1005 includes a deletion-writing unit 1006 for cancelling the pair block and deleting the data. Further, the memory control unit 1002 includes a block size obtaining unit 1004 for obtaining the block size set when initializing the flash memory 1003.

FIG. 4 illustrates the non-volatile data management configuration stored in the SSD 413 illustrated in FIG. 3. According to the present exemplary embodiment, the non-volatile data indicates significant data commonly managed by the CPU-A 401 and the CPU-B 408, which has been conventionally stored in the SRAM, and frequently updated. Referring to FIG. 4, a management number 2001 is a unique identification management number assigned for identifying a non-volatile data region. A region name 2002 indicates a name of the use case corresponding to the non-volatile data region. According to the present example, the use-based information which is to be updated includes the management number, size, update frequency, real-time property, priority level, discrete arrangement state, number of updates, and arrangement position.

The region name 2002 is used as a file name when the CPU-A 401 backs up the non-volatile data in the HDD 407. A size 2003 is the size of the non-volatile data region corresponding to each identification management number, which is predetermined. Update frequency 2004 is the frequency of updating the non-volatile data region, indicated on a scale of 1 to 10 for each identification management number, which is predetermined. As the updated frequency 2004 becomes closer to "10", the non-volatile data region is unconditionally updated at high frequency, and as the updated frequency becomes closer to "1", the non-volatile data region is updated at low frequency under a specific condition.

Real-time property 2005 is a degree of tolerance of a delay generated when updating the non-volatile data region, indicated on a scale of 1 to 10 for each identification management number, which is predetermined. As the real-time property 2005 becomes closer to "10", high real-time property in which the generated delay is close to 0 is required, and as the real-time property 2005 becomes closer to "1", the generated delay becomes tolerable.

Priority level 2006 is the priority level of discretely arranging the data regions, which is obtained by multiplying the above-described update frequency 2004 and real-time property 2005 for each identification management number.

As the priority level 2006 becomes higher, the non-volatile data regions are required to be discretely arranged in priority, and as the priority level 2006 becomes lower, the non-volatile data regions may be sequentially arranged. The priority level 2006 may be calculated by using the value indicated in number of updates 2008 to be described below.

For example, the usage frequency can be included in the priority level 2006 by adding $1/100$ of the value indicated in the number of updates 2008 to the priority level 2006. Discrete arrangement 2007 is a field indicating whether the CPU-A 401 has discretely arranged the data region according to a flowchart illustrated in FIG. 5 to be described below. The value of the discrete arrangement 2007 is set when the non-volatile data is rearranged. If the value in the discrete arrangement 2007 is "Y", it indicates that the CPU-A 401 has discretely arranged the data region, and if the value is "N", it indicates that the CPU-A 401 has sequentially arranged the data region.

The number of updates 2008 is the field indicating the number of times the CPU-A 401 has updated the data region according to a request from the application program, which is incremented when updating the non-volatile data. Arrangement position 2009 is a field indicating an arrangement start logical block address (LBA) determined by the CPU-A 401 according to the flowchart illustrated in FIG. 5. The arrangement position 2009 is set when the CPU-A 401 arranges the non-volatile data. According to the present exemplary embodiment, the application used in performing image processing is stored in the data region to be sequentially arranged and managed.

Figure 5:
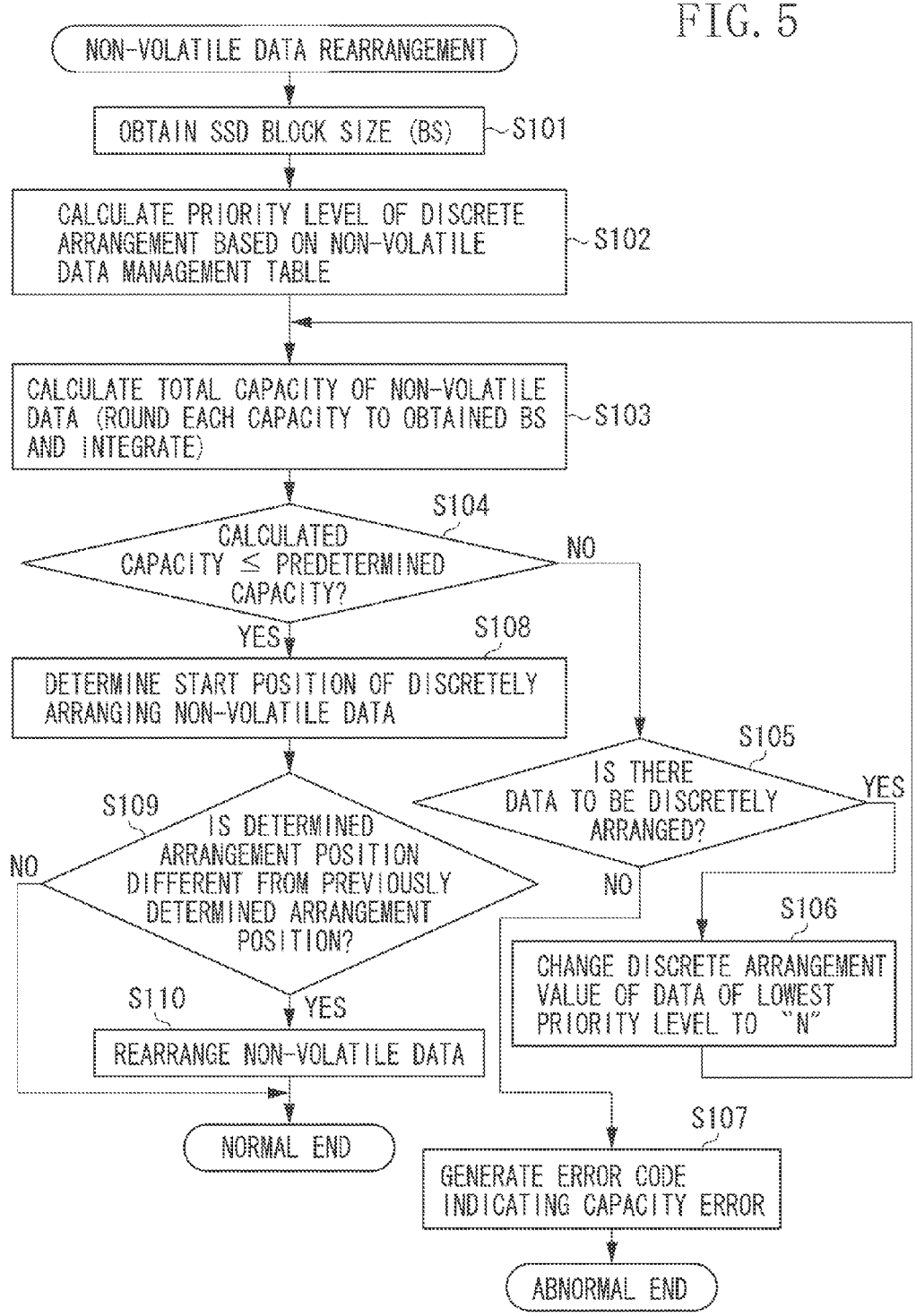
FIG. 5 is a flowchart illustrating a memory management method performed by the image forming apparatus.

FIG. 5 is a flowchart illustrating the memory management method performed by the image forming apparatus according to the present exemplary embodiment. The process illustrated in FIG. 5 is an example of the process for rearranging the non-volatile data in the SSD 413 illustrated in FIG. 3. Each of the steps is realized by the CPU-A 401 executing a control program stored in the ROM-A 402.

It is assumed that the CPU-A 401 executes the rearrangement process illustrated in FIG. 5 when detecting that a system program included in the SSD 413 has been updated at the time of activation. The CPU-A 401 thus executes the rearrangement process when the controller control unit 400 is initially activated, and when the controller control unit 400 is activated after a version of the system program has been upgraded. An example of a process executed by the image forming apparatus which performs image processing using the information stored in the semiconductor memory will be described blow with reference to the flowchart illustrated in FIG. 5. More specifically, the CPU-A 401 obtains from the SSD 413 the block size used for data reading and writing. The CPU-A 401 then discretely arranges and manages, based on the obtained block size, the use-based information among the managed information which is to be updated along with execution of the image processing. The CPU-A 401 discretely arranges and manages the use-based information with respect to a specific region set in the SSD 413.

In step S101, the CPU-A 401 issues, after activating the system program and before activating the application program, the extended command for obtaining the block size to the SSD 413. The CPU-A 401 then checks in units of what the SSD 413 reads data from and writes data in the flash memory 1003.

In step S102, the CPU-A 401 refers to the non-volatile data management table illustrated in FIG. 4, which has been read to the RAM-A 403 as a portion of the system program. The CPU-A 401 then calculates the priority level 2006. In step S103, the CPU-A 401 calculates the capacity of the non-volatile data necessary for discretely arranging the non-volatile data regions indicated by the management number 2001.

More specifically, the CPU-A 401 initially calculates the capacity necessary for discretely arranging each data region by rounding the capacity of each region to the block size obtained in step S101 and integrating the rounded capacities. For example, if the necessary capacity is to be calculated with respect to the data regions corresponding to management numbers "1" to "13" illustrated in FIG. 4, and the block size is 256 kb, the capacity becomes 256×13=3,328 kb.

In step S104, the CPU-A 401 determines whether the capacity calculated in step S103 is less than or equal to a predetermined capacity. If the capacity is not less than or equal to the predetermined capacity (NO in step S104), it becomes necessary to exclude, from the data region to be discretely arranged, the non-volatile data of which the priority level 2006 is low, and recalculate the capacity. The process thus proceeds to step S105. In step S105, the CPU-A 401 determines whether there currently is a data region of which the value in the discrete arrangement 207 indicates that the data is to be discretely arranged.

If the CPU-A 401 determines that there is a data region to be discretely arranged (YES in step S105), the process proceeds to step S106. In step S106, the CPU-A 401 updates the value in the discrete arrangement 2007 from "Y" to "N" for the data region having the lowest priority level 2006 in the non-volatile data management table, to decrease the data regions to be discretely arranged. The process then returns to step S103, and the CPU-A 401 recalculates the non-volatile data capacity. As a result, the CPU-A 401 calculates the amount of information to be discretely arranged based on the information to be managed. If the calculated amount of information to be discretely arranged exceeds a predetermined amount, the CPU-A 401 changes the information identified from the information to be managed, from the information to be discretely arranged to the information to be sequentially arranged with respect to the SSD 413. When the information is changed from the information to be discretely arranged to the information to be sequentially managed, the number of updates corresponding to one block is collectively incremented.

On the other hand, if the CPU-A 401 determines that there is a capacity shortage even when there is no data to be discretely arranged (NO in step S105), the process proceeds to step S107. In step S107, the CPU-A 401 displays an error code indicating the capacity shortage with respect to the non-volatile data, and ends the rearrangement process.

As described above, the CPU-A 401 changes the data regions of low priority level to the data regions to be sequentially arranged so that the non-volatile data capacity becomes less than or equal to the predetermined capacity. As a result, the CPU-A 401 determines the data regions to be discretely arranged. In step S108, the CPU-A 401 determines the arrangement position (i.e., the logic block address) as illustrated in FIGS. 6A, 6B, and 6C to be described blow, according to the size 2003.

In step S109, the CPU-A 401 determines whether the arrangement position determined in step S108 is different from the value in the arrangement position 2009 determined in the previous activation. If the CPU-A 401 determines that the arrangement position is different (YES in step S109), the process proceeds to step S110. In step S110, the CPU-A 401 determines that the arrangement position has been changed. The CPU-A 401 then changes the positions of the data regions via the RAM-A 403 while maintaining the content of the non-volatile data. The CPU-A 401 updates the value in the arrangement position 2009 to the value determined in step S108, and the process ends.

On the other hand, if the CPU-A 401 determines that the arrangement position is the same as the previous arrangement position (NO in step S109), the process ends without performing step S110.

FIGS. 6A, 6B, and 6C illustrate examples of the arrangement of the non-volatile data in the flash memory 1003 illustrated in FIG. 3. The examples of FIGS. 6A, 6B, and 6C illustrate the non-volatile data in the flash memories 1003, which has been arranged according to the flowchart illustrated in FIG. 5. According to the present example, the information to be discretely arranged is changed and managed according to the block size.

Referring to FIGS. 6A, 6B, and 6C, right and left blocks indicated by bars form a pair, and a logic block number is allocated to the pair. The flash control unit 1000 responds to a request for updating the logic block number by additionally writing the difference (i.e., performing difference writing) in units of pages in the right block of the pair. The flash control unit 1000 performs the above operation instead of directly rewriting the left block. If the capacity of the right block becomes short, the previously added difference information is merged in the left block, and the pair is updated.

FIG. 6A illustrates the example of arranging, if the block size is 128 kb and an upper-limit of the capacity obtained in step S104 illustrated in FIG. 5 is 1408 kb, each of the non-volatile data regions indicated in the non-volatile data management table illustrated in FIG. 4. In such a case, the data regions corresponding to the management numbers 2001 "1" to "7" are discretely arranged, and the remaining data regions are sequentially arranged.

FIG. 6B illustrates the example of arranging, if the block size is 256 kb and the upper-limit of the capacity obtained in step S104 is 1408 kb, each of the non-volatile data regions indicated in the non-volatile data management table. In such a case, the data regions corresponding to the management numbers 2001 "1" to "3" are discretely arranged, and the remaining data regions are sequentially arranged.

FIG. 6C illustrates the example of arranging, if the block size is 512 kb and the upper-limit of the capacity obtained in step S104 is 1408 kb, each of the non-volatile data regions indicated in the non-volatile data management table. In such a case, only the data region corresponding to management number 2001 "1" is discretely arranged, and the remaining data regions are sequentially arranged.

As a result, the time delay with respect to updating the non-volatile management data of high priority level can be maintained to be less than or equal to a predetermined period, even when the semiconductor storage is changed from the SRAM to the SSD. Further, timing at which there is a delay due to the updating can be predicted according to the number of updates. The SSD can thus be safely used as a substitute region of the SRAM, and the cost can be reduced without lowering the performance.

FIG. 7 is a flowchart illustrating a memory management method performed by the image forming apparatus according to the present exemplary embodiment. The process illustrated in FIG. 7 is an example of the process for deleting and writing non-volatile data with respect to the SSD 413 illustrated in FIG. 3. Each of the steps is realized by the CPU-A 401 executing a control program stored in the ROM-A 402. The process for cancelling, when the image forming apparatus is in an idle state, a state of additionally writing a difference in a flash memory from another flash memory, both of which form a pair block, and generating a new pair state will be described below.

As described above, according to the present example, a time delay which is necessary for updating each region that has been discretely or sequentially arranged depending on the priority level is actively generated during a period when a delay is allowable. The delay is thus reduced when the image forming apparatus is continuously used.

If the processing time for updating non-volatile data is to be maintained within a predetermined period, it is desirable to additionally write in a right block of the blocks constituting a pair in the flash memory 1003 at all times. It is thus necessary to prevent the capacity of the right block from becoming short. To solve such an issue, while the image forming apparatus is in the idle state, the state of additionally writing the difference is cancelled, and a new pair state is generated.

In step S201, it is assumed that the image forming apparatus is in the idle state before starting a job. In step S202, it is assumed that the image forming apparatus is in the idle state when an engine starts performing density adjustment. In step S203, it is assumed that the image forming apparatus is in the idle state immediately after completing the job. The CPU-A 401 then performs the non-volatile data difference writing cancellation process under the above-described condition. In step S204, the CPU-A 401 obtains a start time of the process. In step S205, the CPU-A 401 refers to the non-volatile data management table illustrated in FIG. 4, and identifies the data regions to be discretely arranged based on the information indicated in the discrete arrangement 2007.

In step S206, the CPU-A 401 similarly identifies the data regions of which the number of updates 2008 has exceeded a predetermined number of updates. For example, the predetermined number of updates may be equal to a number of pages included in the block.

In step S207, the CPU-A 401 issues to the SSD 413 a deletion-writing command with respect to one non-volatile data region identified based on the arrangement position 2009 and the size 2003, according to the priority level 2006. More specifically, in step S207, the data in the non-volatile data region is not updated. The same content of the currently written data is written in the data region along with deleting the data, so that only the above-described pair updating process is performed.

In such a case, the CPU-A 401 updates the number of updates 2008 of the corresponding region to "0". In step S208, the CPU-A 401 calculates a cumulative update processing time and determines whether the calculated update processing time has exceeded a predetermined period.

If the calculated update processing time is within the predetermined period (NO in step S208), the process proceeds to step S209. In step S209, the CPU-A 401 determines whether there is a region in which the pair has not yet been updated, for performing further updates. If the CPU-A 401 determines that there is a non-volatile data region in which the update process has not been completed (YES in step S209), the process returns to step S207. The CPU-A 401 then similarly calculates the next non-volatile data region, and issues the deletion-writing command.

On the other hand, if the CPU-A 401 determines that the calculated update processing time has exceeded the predetermined period (YES in step S208), or that there is no other region to be processed (NO in step S209), the non-volatile data difference writing cancellation process ends. According to the present exemplary embodiment, if the CPU-A 401 determines that the difference updating time is within the predetermined period, the CPU-A 401 performs the process for cancelling the difference updating state with respect to the specific region set in the SSD 413.

As a result, the non-volatile data difference writing cancellation process can be controlled to be performed while the image forming apparatus is in the idle state, so that the original image processing is not delayed.

FIG. 8 is a flowchart illustrating the memory management method performed by the image forming apparatus according to the present exemplary embodiment. The example of FIG. 8 illustrates a deletion-writing execution process performed with respect to the non-volatile data managed in the SSD 413 illustrated in FIG. 3. More specifically, the process corresponds to the process in detail for determining the region to be deleted, performed in step S205 and step S206 in the flowchart illustrated in FIG. 7. Each of the steps is realized by the CPU-A 401 executing the control program stored in the ROM-A 402. The process as follows will be described below. The CPU-A 401 cancels the difference updating state with respect to the specific region set in the SSD 413 so that the number of updates does not exceed a predetermined value, according to the priority level managed based on the table illustrated in FIG. 4.

In step S301, the CPU-A 401 starts the process for determining whether the data deletion-writing process is to be performed on a data region, sequentially from the data region corresponding to the first management number 2001 (ID=1) illustrated in FIG. 4. In step S301, "OBJID" indicates the value in the management number 2001 of the table illustrated in FIG. 4 to be currently determined.

In step S302, the CPU-A 401 determines whether the region indicated by the OBJID is to be discretely arranged, based on the information stored in the discrete arrangement 2007.

If the region is not to be discretely arranged (NO in step S302), the process proceeds to step S303. In step S303, the CPU-A 401 similarly determines whether the data region indicated by the OBJID is a data region of which the value in the number of updates 2008 exceeds a predetermined number of updates. If the CPU-A 401 determines that the data region is to be discretely arranged (YES in step S302), or that the number of updates of the data region is greater than or equal to the predetermined number of updates (YES in step S303), the process proceeds to step S304. In step S304, the CPU-A 401 writes, in a data deletion-writing allowed/disallowed determination field (not illustrated) in the non-volatile data management table, the information indicating "allowed". The CPU-A 401 then proceeds to determining the data region corresponding to the subsequent management number 2001.

On the other hand, if the CPU-A 401 determines that the number of updates with respect to the data region indicated by the OBJID has not reached the predetermined number of updates (NO in step S303), the process proceeds to step S305. In step S305, the CPU-A 401 determines whether the OBJID has reached an upper limit of the management number 2001.

If the CPU-A 401 determines that the OBJID has not reached the upper limit (NO in step S305), the CPU-A 401 continues the process, so that the process proceeds to step S307. In step S307, the CPU-A 401 increments the OBJID, which corresponds to the data region to be processed and managed, and changes the OBJID to the value indicating the subsequent management number 2001. The process then returns to step S302.

On the other hand, if the CPU-A 401 determines that the determination has been performed for all regions (YES in step S305), the process proceeds to step S306. In step S306, the CPU-A 401 ends the process for determining whether the data deletion-writing process is to be performed on the data region. As described above, the CPU-A 401 determines whether the data deletion-writing process is to be performed on the data region according to the value indicating whether the data is to be discretely arranged, and to the number of updates, in which the priority level is considered.

As a result, the time necessary for updating the non-volatile management data of high priority level can be controlled to be less than or equal to a predetermined period even when the semiconductor storage has been changed. The image forming apparatus can be continuously operated without a sudden update delay. The SSD can thus be safely used as a substitute region of the SRAM, and the cost can be reduced without lowering the performance.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-018366 filed Feb. 1, 2013, and No. 2013-018386 filed Feb. 1, 2013, which is hereby incorporated by reference herein in its entirety.

What is claimed is:

1. An image forming apparatus that performs image processing using information stored in a semiconductor memory, the image forming apparatus comprising:
   an obtaining unit configured to obtain from the semiconductor memory block size information indicating a block size of a block in the semiconductor memory; and
   a management unit configured to manage information which is related to the image processing apparatus to be updated along with execution of the image processing; and
   a storing unit configured to store, by arranging discretely in blocks in the semiconductor memory, at least a part of information which is related to the image processing apparatus in view of frequency of updating the information which is related to the image processing apparatus, priority of the information which is related to the image processing apparatus and the block size indicated by the block size information obtained by the obtaining unit so as to reduce a number of times of updating the blocks with the information related to the image processing apparatus in a predetermined time period.

2. The image forming apparatus according to claim 1, further comprising:
   a calculation unit configured to calculate an amount of information to be discretely arranged, based on information managed by the management unit; and
   a changing unit configured to change, in a case where the calculated amount of information to be discretely arranged exceeds a predetermined amount, information identified from information managed by the management unit from information to be discretely arranged to information to be sequentially arranged with respect to the semiconductor memory.

3. The image forming apparatus according to claim 2, wherein the management unit collectively increments, in a case where the information identified from information managed by the management unit is to be changed from information to be discretely arranged to information to be sequentially arranged, a number of updates with respect to one block.

4. The image forming apparatus according to claim 1, wherein the semiconductor memory stores an application used for performing the image processing in a region to be sequentially arranged.

5. The image forming apparatus according to claim 1, wherein the management unit performs difference writing on a pair block acquired in the semiconductor memory so that a time delay generated in updating each region which is discretely or sequentially arranged according to a priority level with respect to the semiconductor memory does not exceed a predetermined period.

6. The image forming apparatus according to claim 1, wherein the semiconductor memory is a flash memory that forms a pair block.

7. The image forming apparatus according to claim 1, wherein the management unit changes and manages, according to the block size, information to be discretely arranged.

8. The image forming apparatus according to claim 1, wherein the use-based information to be updated with respect to the semiconductor memory includes management number, size, update frequency, real-time property, priority level, discrete arrangement state, number of updates, and arrangement position.

9. The image forming apparatus according to claim 1, wherein the information related to the image processing apparatus includes information regarding at least one of plural kinds of usage counters and parameters regarding image forming to be adjusted.

10. The image forming apparatus according to claim 9, wherein the information related to the image processing apparatus includes information which has lower priority than the information regarding at least one of plural kinds of usage counters and the parameters regarding image forming to be adjusted, and
    wherein the storing unit arranges at least a part of the information which has the lower priority to the block not discretely.

11. A memory management method for an image forming apparatus that performs image processing using information stored in a semiconductor memory, the memory management method comprising:
    obtaining from the semiconductor memory block size information indicating a block size of a block in the semiconductor memory; and
    managing information which is related to the image processing apparatus to be updated along with execution of the image processing; and
    storing from a storing unit, by arranging discretely in blocks in the semiconductor memory, at least a part of information which is related to the image processing apparatus in view of frequency of updating the information which is related to the image processing apparatus, priority of the information which is related to the image processing apparatus and the block size indicated by the block size information obtained by the obtaining unit so as to reduce a number of times of updating the blocks with the information related to the image processing apparatus in a predetermined time period.

12. A non-transitory computer-readable storage medium storing a program that causes a computer to perform the memory management method according to claim 11.

* * * * *